Patented Oct. 22, 1940

2,218,986

UNITED STATES PATENT OFFICE 2,218,986

ORTHO-HYDROXY AZO DYE

Otto Hoffmann and Hans Lange, Dessau in Anhalt, Germany, assignors to General Aniline & Film Corporation, a corporation of Delaware No Drawing. Application July 3, 1939, Serial No. 282,690. In Germany July 7, 1938

6 Claims. (Cl. 260—197)

The present invention relates to a process for manufacturing azo dyes and to the products thus obtainable.

It is known from U. S. Patents Nos. 1,419,501 and 1,431,655 that valuable blue dyes capable of being chromed are obtained by coupling halogen derivatives of the 2-hydroxy-diazo-benzene with a 8-halogeno - 1 - hydroxynaphthalene-5-sulfonic acid. When exposed to artificial light the tint of these dyes, as described in said specifications, generally changes only to a small extent.

According to the present invention dyes capable of being chromed are obtained the dyeings of which have in the artificial light practically the same tint if, instead of the 8-halogeno-1-hydroxynaphthalene-5-sulfonic acid, the 1-methyl-4-chloro-5-hydroxynaphthalene-1'-sulfonic acid is used as azo component.

The 1-methyl-4-chloro-5-hydroxynaphthalene-1'-sulfonic acid mentioned as azo component is obtainable by treating 4-chloro-5-nitro-1-naphthomethyl chloride with sodium sulfite to form the 1-methyl - 4 - chloro-5-nitronaphthalene-1'-sulfonic acid by reducing the nitro group and by heating the amino acid thus formed with sulfuric acid under pressure. The 4-chloro-5-nitro-1-naphthomethyl chloride mentioned above can be produced by chlorinating 1'-chloro-1-methyl-5-nitronaphthalene in the presence of an antimony halide and dissolved in a trichlorinated hydrocarbon. For these specific processes for manufacturing the said compounds we have filed separate applications.

The dyes obtained by the procedure which is the subject matter of the present invention show, when applied to wool by the one-bath chroming process or by an after-chroming process, a displacement of the shade to the green side so that pure navy-blue dyeings are obtained which cannot be produced with the known dyes. The other properties of the dyeings such as fastness to light, to washing, and to wet-processing are very good.

The following examples illustrate the invention, the parts being by weight:

*Example 1.*—21.3 parts of 3.4.6-trichloro-2-amino-1-hydroxybenzene are suspended with 100 parts of water, 30 parts of hydrochloric acid of 12° Bé are added and the whole is diazotized by means of 6.9 parts of sodium nitrite. The diazo suspension is run into a solution of 28.5 parts of 1-methyl-4-chloro-5-hydroxynaphthalene-1'-sulfonic acid and 25 parts of sodium carbonate in about 500 parts of water to which ice has been added. After coupling is complete the dye is worked up in the usual manner. After drying it constitutes a dark powder of good solubility which dyes wool navy-blue tints when applied by the after-chroming process.

*Example 2.*—24.7 parts of 3.4.5.6-tetrachloro-2-amino-1-hydroxybenzene are introduced at 20 to 25° C. into 180 parts of sulfuric acid of 66° Bé; 7.5 parts of sodium nitrite are then added at 20° C. to 25° C. The mixture is heated for one hour at 50° C. and then cooled with ice. It is filtered with suction and the residue on the filter is washed with a small quantity of water. This residue is suspended with 200 parts of water for the purpose of coupling and the suspension obtained is added to a solution of 28.5 parts of 1-methyl - 4 - chloro-5-hydroxynaphthalene-1'-sulfonic acid and 8.2 parts of sodium bicarbonate in 250 parts of water with an addition of ice. After coupling is complete 8 parts of sodium carbonate are added; the dye is then worked up in the usual manner. After drying it constitutes a dark powder which dissolves in water while assuming a blue coloration; when applied to wool by the one-bath chroming process it yields a greenish, clear navy-blue.

Instead of the polychloro-2-aminophenols named in the examples there may also be used, for instance, 4-chloro - 2 - amino-1-hydroxybenzene, 4.6 - dichloro - 2 - amino-1-hydroxybenzene, 3.4.6 - trichloro-5-bromo-2-amino-1-hydroxybenzene, 4.6 - dichloro - 3.5-dibromo-2-amino-1-hydroxybenzene.

What we claim is:

1. The azo dyes which correspond to the general formula

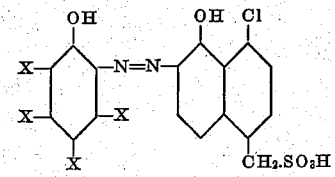

in which X is a member of the group consisting of hydrogen, chlorine and bromine, at least one of the X's being one of the said halogens, said dyes dyeing wool in the presence of a chromium mordant or when combined with an after-chroming process pure navy-blue tints of excellent fastness to light and washing which are not altered in artificial light.

2. The azo dye which corresponds to the general formula

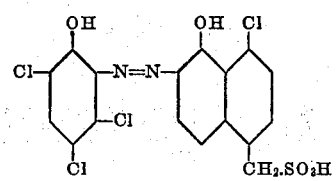

said dye dyeing wool in the presence of a chromium mordant or when combined with an after-chroming process pure navy-blue tints of excellent fastness to light and washing which are not altered in artificial light.

3. The azo dye which corresponds to the general formula

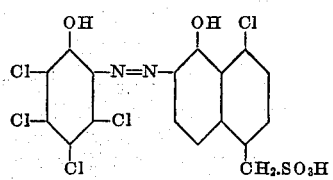

said dye dyeing wool in the presence of a chromium mordant or when combined with an after-chroming process pure navy-blue tints of excellent fastness to light and washing which are not altered in artificial light.

4. The process which comprises diazotizing an amine of the general formula

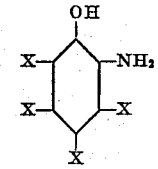

in which X is a member of the group consisting of hydrogen, chlorine and bromine, at least one X being one of the said halogens, and coupling the diazo compound with 1-methyl-4-chloro-5-hydroxynaphthalene-1'-sulfonic acid.

5. The process which comprises diazotizing 1-hydroxy-2-amino-3.4.6-trichlorobenzene and coupling the diazo compound with 1-methyl-4-chloro-5-hydroxynaphthalene-1'-sulfonic acid.

6. The process which comprises diazotizing 1-hydroxy-2-amino-3.4.5.6-tetrachlorobenzene and coupling the diazo compound with 1-methyl-4-chloro-5-hydroxynaphthalene-1'-sulfonic acid.

OTTO HOFFMANN.
HANS LANGE.